United States Patent [19]

Verheyden et al.

[11] 3,755,295

[45] Aug. 28, 1973

[54] 1-(2-AMINO-2-DEOXY-β-D-RIBOFURANOSYL) PYRIMIDINES AND DERIVATIVES THEREOF

[75] Inventors: Julien P. Verheyden; John G. Moffatt, both of Los Altos, Calif.

[73] Assignee: Syntex Corporation, Republic of Panama

[22] Filed: Oct. 24, 1969

[21] Appl. No.: 869,355

[52] U.S. Cl......... 260/211.5 R, 260/112.5, 260/999
[51] Int. Cl............................................. C07d 51/52
[58] Field of Search.................. 260/211.5 R, 112.5

[56] References Cited
UNITED STATES PATENTS 3,155,647   11/1964   Dutcher et al............... 260/211.5 R
3,278,518   10/1966   Schramm et al............. 260/211.5 R
3,541,079   11/1970   Schramm et al............. 260/211.5 R

*Primary Examiner*—Lewis Gotts
*Assistant Examiner*—Johnnie R. Brown
*Attorney*—Evelyn K. Merker, Gerard A. Blaufarb and William B. Walker

[57] ABSTRACT

1-(2-Amino-2-deoxy-β-D-ribofuranosyl)pyrimidines and the corresponding 2-aminoacylamido and 2-dipeptidylamido compounds are useful in controlling metabolic processes.

18 Claims, No Drawings

1-(2-AMINO-2-DEOXY-β-D-RIBOFURANOSYL) PYRIMIDINES AND DERIVATIVES THEREOF

This invention relates to 1-(2-amino-2-deoxy-β-D-ribofuranosyl)pyrimidines and derivatives thereof.

Prior to this invention, 1-(2-amino-2-deoxy-β-D-ribofuranosyl)pyrimidines and derivatives thereof were unknown. 3'-Amino-3'-deoxy purine and pyrimidine nucleosides were known, one such compound being the antibiotic puromycin. 2'-Amino-2'-deoxy adenosine was prepared by Wolfrom (J.O.C. 32, 1823) from 2'-amino-2'-deoxyribose derivatives as were some 2'-amino-2'-deoxy glucopyranosyl nucleosides (J.O.C. 32, 2757). However, previous attempts to prepare 2'-amino-2'-deoxy uridine by opening a 2,2'-anhydro-1-(β-D-arabinofuranosyl)uracil with azide ion (J.O.C. 27, 3045, and J. Chem. Soc. 1958, 4242) were unsuccessful. This invention therefore includes not only the indicated compounds but the novel and unobvious procedure for preparing them.

In summary, the compounds of this invention include compounds represented by the formula:

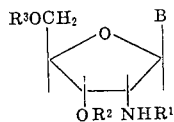

wherein
B is a pyrimidine base or a conventional hydrolyzable acyl derivative thereof;
$R^1$ is hydrogen, an acyl group of an amino acid, an acyl group of a dipeptide, or a conventional hydrolyzable acyl derivative thereof; and
$R^2$ and $R^3$ each is hydrogen or a conventional hydrolyzable acyl group.

The term "pyrimidine base" as used herein, refers to an unsubstituted or substituted pyrimidine or 6-azapyrimidine group wherein the point of attachment to the furanose unit is through the 1-position of the pyrimidine group. More specifically, the pyrimidine bases include uracil-1-yl, cytosin-1-yl, 5-bromouracil-1-yl, 5-chlorouracil-1-yl, 5-iodouracil-1-yl, 5-fluorouracil-1-yl, 5-fluorocytosin-1-yl, thymin-1-yl, 5-methylcytosin-1-yl, 5-trifluoromethyluracil-1-yl, 5-trifluoromethylcytosin-1-yl, 5-aminouracil-1-yl, 5-aminocytosin-1-yl, 5-methylaminouracil-1-yl, 5-dimethylaminouracil-1-yl, 5-methylaminocytosin-1-yl, 5-dimethylaminocytosin-1-yl, 5-hydroxyuracil-1-yl, 6-azauracil-1-yl, 6-azacytosin-1-yl, 6-azathymin-1-yl, and the like.

The terms "hydrolyzable esters", "hydrolyzable acyloxy groups" and "hydrolyzable acyl derivatives," as used herein, refer to those esters and acyl derivatives conventionally employed in the nucleoside and nucleotide art, preferably those derived from carboxylic acids having from one to 12 carbon atoms. Typical conventional hydrolyzable acyl groups thus include acetyl, propionyl, butyryl, valeryl, isovaleryl, hexanoyl, heptanoyl, octanoyl, nonanoyl, undecanoyl, lauraloyl, benzoyl, phenyllacetyl, phenylpropionyl, o-, m-, p-methylbenzoyl, β-cyclopentylpropionyl, dihydrocinnamoyl, and the like.

The term "amino acids" refer to naturally occurring amino acids such as those obtained from proteins from animal or vegetable sources as well as products having similar structures isolated from microorganisms. Examples of typical amino acids include glycine, the L forms of alanine, valine, leucine, isoleucine, phenylalanine, tyrosine, proline, hydroxyproline, serine, threonine, cystenine, cystine, methionine, tryptophane, aspartic acid, glutamic acid, arginine, lysine, histidine, β-alanine, α-aminobutyric acid, γ-aminobutyric acid, thyroxine, diiodotyrosine, β-thiolvaline, α,γ-diaminobutyric acid, ornithine, hydroxylysine, and the like and the D form of valine, leucine, serine, cysteine, phenylalanine, aspartic acid and glutamic acid, for example.

The term "dipeptide" refers to any of the various conventional dipeptides derived from two of the above amino acids.

The compounds of this invention exhibit antimetabolic properties and are accordingly useful in producing metabolic deficiencies in biological systems. For example, they are useful in inhibiting the growth of several bacteria, such as Shigella dysenteria, Shigella parody, pseudomonas aeruginosa, bacillus subtilis.

Certain compounds of this invention are prepared by a procedure which can be illustrated as follows:

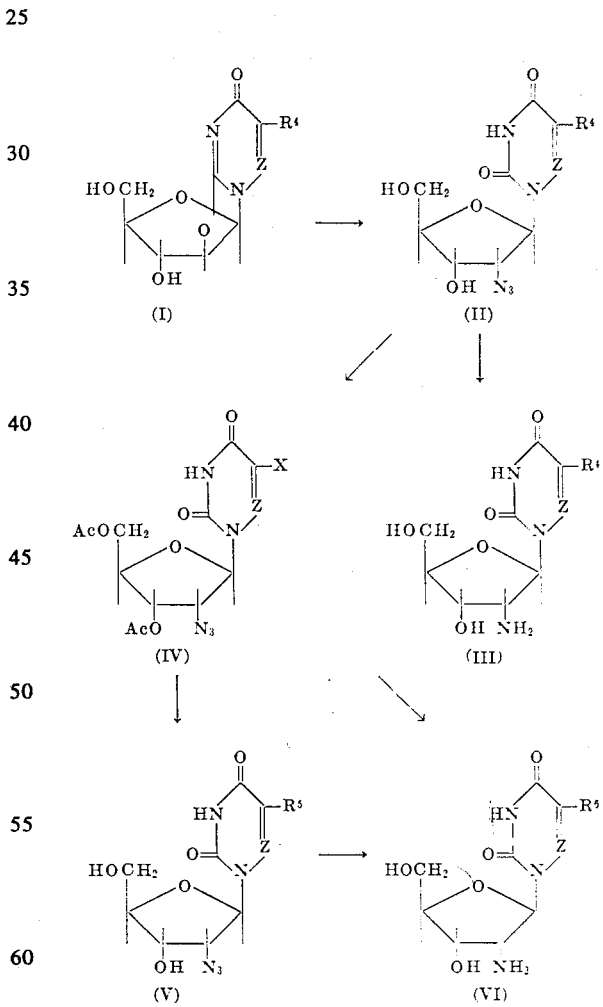

In the above illustrated procedure,
$R^4$ is hydrogen, methyl, fluoro or trifluoromethyl;
$R^5$ is amino, methylamino, or dimethylamino;

$R^6$ is amino, methylamino, dimethylamino, chloro, bromo or iodo;

X is chloro, bromo or iodo; and

Z is a methine group or nitrogen.

The compounds of Formula I are known in the art or can be prepared by procedures which are known in the art. For example, uridine or the corresponding 5-fluoro or 5-methyluridine can be converted to the corresponding 2,2'-anhydro compounds of Formula I by treating them with thiocarbonyldiimidazole in an inert organic solvent such as toluene at reflux for one hour followed by chromatographic purification as described in J. Med. Chem. 9, 101 (1966), or by treatment with diphenylcarbonate and sodium bicarbonate in hot dimethylformamide as described in Biochem. 5, 2076 (1966).

The 2'-azido compounds of Formula II are prepared by treating the compounds of Formula I with sodium or lithium azide in an aprotic solvent such as dimethyl sulfoxide, dimethylformamide, or hexamethylphosphoramide in the presence of benzoic acid or 2,4,6-trimethylbenzoic acid at elevated temperatures, preferably from 140° to 170°C for from five minutes to four hours.

The 2'-amino compounds of Formula III are prepared by reducing the compounds of Formula II in the presence of a palladium or Raney-nickel catalyst or with sodium borohydride in a suitable solvent such as methanol or isopropanol.

The 5-bromo and 5-chloro compounds of Formula IV are prepared by acylating the 2'-azido compounds of Formula II with acetic anhydride in dimethylformamide in the presence of pyridine, for example, and reacting the acylated product with a corresponding N-bromosuccinimide or N-chlorosuccinimide in a suitable solvent. The 5-iodo compounds of Formula IV are prepared by reacting the acylated product with N-iodosuccinimide in the presence of dibutylsulfide (catalyst) in dimethylsulfoxide (solvent) as described in J.B.C. 238, PC 2249 (1963).

The compounds of Formula VI wherein $R^6$ is chloro, bromo or iodo are prepared by reducing the 2'-azido compounds of Formula IV with sodium borohydride followed, if necessary, by removal of the acyl protecting groups with aqueous ammonium hydroxide.

The compounds of Formula VI wherein $R^6$ is amino or methyl-amino can be prepared as follows. The 5-bromo compounds of Formula IV are reacted with ammonia, methylamine or dimethylamine at about 80°C for 18 hours under pressure to yield the 2'-azido compounds of Formula V. The compounds of Formula V are then reduced with palladium-on-charcoal in methanol, for example, to yield the corresponding 2'-amino compounds of Formula VI.

The cytidine, 6-azacytidine and the corresponding 5-substituted compounds can be prepared by a procedure illustrated as follows:

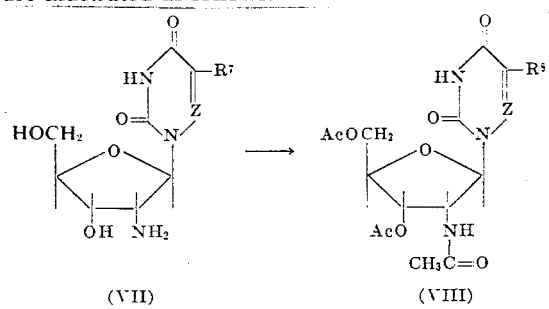

(VII) (VIII)

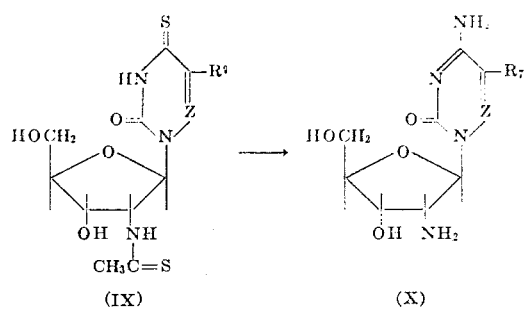

(IX) (X)

In the above formulas, $R^7$ is hydrogen, fluoro, methyl, trifluoromethyl, amino, methylamino, or dimethylamino;

$R^8$ is hydrogen, fluoro, methyl, trifluoromethyl, acetamido, methylacetamido, or dimethylamino;

$R^9$ is hydrogen, fluoro, methyl, trifluoromethyl, thioacetamido, methylthioacetamido, or dimethylamino; and Z is as previously defined.

The compounds of Formula VIII are prepared by reacting the compounds of Formula VII with acetic anhydride in pyridine. The acetylated product is then reacted with phosphorous pentasulfide in pyridine at a temperature of from 80° to 120°C, for from one to 20 hours, preferably at the reflex temperature of the solution for from about one to four hours to yield the compounds of Formula IX. By reacting the latter compounds with ammonia in a lower alcohol such as an absolute methanol solution saturated with ammonia at a temperature of from 50° to 120°C for from one hour to five days, preferably at about 95°C under pressure for from about eight to 36 hours, the compounds of Formula X are obtained.

The aminoacylamido and dipeptidylamido compounds of this invention can be prepared by a procedure illustrated as follows:

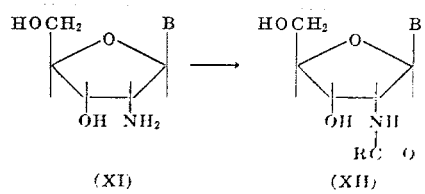

(XI) (XII)

In the above formulas,

B is as previously defined; and

is an acyl group of an amino acid or an acyl group of a dipeptide.

The compounds of Formula XII are prepared by reacting the compounds of Formula XI with the N-hydroxysuccinimide ester of the respective N-protected amino acid or dipeptide or with the N-hydroxysuccinimide ester of the respective monobenzyl esters of N-protected dicarboxylic amino acids or dipeptides. The reaction is conducted in a solvent such as aqueous ethanol or dimethylformamide containing triethylamine for from one to 20 hours at a temperature of from 20° to 50°C. The solution is then acidified, and the respective compounds of Formula XII are separated therefrom. The amino protecting group (N-t-butoxycarbonyl, N-carbobenzyloxy or monomethyoxytrityl) is then removed by treatment with acid or by catalytic hydrogenolysis using a palladium catalyst to give the respective compounds of Formula XII which are purified and isolated by chromatography.

PREPARATION 2,2'-Anhydro-1-($\beta$-D-arabinofuranosyl)-5-fluorouracil

5-Fluorouridine (1.4 g.) is suspended in 50 ml. of dry toluene, 1 g. of thiocarbonyldiimidazole is added. The reaction mixture is refluxed for one hour, chilled, and extracted three times with water. The aqueous phase is treated with carbon and evaporated to dryness, leaving a solid residue which is purified by preparative thin layer chromatography giving 2,2'-anhydro-1-($\beta$-D-arabinofuranosyl)-5-fluorouracil.

This invention is further illustrated by the following specific but non-limiting examples.

EXAMPLE 1

2'-Azido-2'-deoxyuridine

A solution of 2,2'-anhydro-1-($\beta$-D-arabinofuranosyl)-uracil (4.5 g., 20 mmoles), lithium azide (7 g., 143 mmoles) and 2,4,6-trimethylbenzoic acid (3.6 g., 22 mmoles) or benzoic acid (2.7 g., 22 mmoles) in 50 ml. of dimethyl sulfoxide is kept at 150°C for 90 minutes. After cooling, the reaction mixture is poured into one liter of ether with vigorous agitation to yield a brown syrup which is separated from the ether layer. The syrup is dissolved in 500 ml. of methanol, and 140 ml. of ion-exchange resin (Dowex 50 H$^+$ form) is added. After stirring for 30 minutes, the ion-exchange resin is removed by filtration, and the filtrate is evaporated to dryness under vacuum. The residue is dissolved in a small amount of methanol and applied to several preparative thin layer chromatography plates (silica gel HF, 1.3 mm. thick, 0.2 × 1 m.). After elution with a mixture of ethyl acetate and acetone (1:1), the major UV absorbing band is eluted with methanol to yield 2'-azido-2'-deoxyuridine.

EXAMPLE 2

2'-Azido-2'-deoxy-5-fluorouridine

To a solution of 2,2'-anhydro-1-($\beta$-D-arabinofuranosyl)-5-fluorouracil (12.2 g.), benzoic acid (6.7 g.) in 160 ml. of hexamethylphosphoramide is added lithium azide (17.5 g.). The suspension is heated in a 160°C bath for 20 minutes. After cooling the reaction mixture, 500 ml. of water is added, and the mixture is extracted with 250 ml. of chloroform. The chloroform layer is carefully back extracted with water, and the water extracts are evaporated to dryness, dissolved with a mixture of methanol in acetone (1:9), filtered, and evaporated to dryness. The residue is dissolved in acetone containing a minimum amount of methanol (to achieve complete solution) and passed through a short column of silica gel. Eluting the column with acetone yields 2'-azido-2'-deoxy-5-fluorouridine.

EXAMPLE 3

Other 2'-azido-2'-deoxyuridines and 2'-azido-2'-deoxy-6-azauridines

Repeating the procedure of Example 1 but replacing 2,2'-anhydro-1-($\beta$-D-arabinofuranosyl)-uracil with 2,2'-anhydro-1-($\beta$-D-arabinofuranosyl)-6-azauracil,
2,2'-anhydro-1-($\beta$-D-arabinofuranosyl)-5-methyluracil,
2,2'-anhydro-1-($\beta$-D-arabinofuranosyl)-6-aza-5-methyluracil,
2,2'-anhydro-1-($\beta$-D-arabinofuranosyl)-6-aza-5-fluorouracil,
2,2'-anhydro-1-($\beta$-D-arabinofuranosyl)-5-trifluoromethyl-uracil, and
2,2'-anhydro-1-($\beta$-D-arabinofuranosyl)-6-aza-5-trifluoro-methyluracil yields the corresponding
2'-azido-2'-deoxy-6-azauridine,
2'-azido-2'-deoxy-5-methyluridine,
2'-azido-2'-deoxy-6-aza-5-methyluridine,
2'-azido-2'-deoxy-6-aza-5-fluorouridine,
2'-azido-2'-deoxy-5-trifluoromethyluridine, and
2'-azido-2'-deoxy-6-aza-5-trifluoromethyluridine.

EXAMPLE 4

2'-Amino-2'-deoxyuridine

A solution of 2'-azido-2'-deoxyuridine (4 mmoles) in 100 ml. of methanol is hydrogenated at atmospheric pressure in the presence of 400 mg. of palladium-on-carbon (10 percent) for 1.5 hours at room temperature. The catalyst is removed by filtration, and the filtrate is evaporated to dryness. The residue is purified by preparative thin layer chromatography using acetone as the eluant. Elution of the main UV-absorbing band yields 2'-amino-2'-deoxyuridine which is recrystallized from methanol.

EXAMPLE 5

Other 2'-amino-2'-deoxyuridines and 2'-amino-2'-deoxy-6-azauridines

Repeating the procedure of Example 4 with the products of Examples 2 and 3 yields the corresponding
2'-amino-2'-deoxy-5-fluorouridine,
2'-amino-2'-deoxy-6-azauridine,
2'-amino-2'-deoxy-5-methyluridine,
2'-amino-2'-deoxy-6-aza-5-methyluridine,
2'-amino-2'-deoxy-6-aza-5-fluorouridine,
2'-amino-2'-deoxy-5-trifluoromethyluridine, and
2'-amino-2'-deoxy-6-aza-5-trifluoromethyluridine.

EXAMPLE 6

3',5'-Di-O-acetyl-2'-azido-2'-deoxyuridine and 6-azauridine

To a solution of 2'-azido-2'-deoxyuridine (800 mg.) in dimethylformamide (30 ml.) is added acetic anhydride (6 ml.) and pyridine (3 ml.). The reaction mixture is left at room temperature for 18 hours, and evaporated to dryness under vacuum. The resulting syrup is partitioned between water and ethyl acetate. The organic layer is dried over magnesium sulfate and evaporated to dryness, giving a syrup which is purified by preparative thin layer chromatography using ether-ethyl acetate (1:1) as eluant to yield 3',5'-di-O-acetyl-2'-azido-2'-deoxyuridine.

Repeating the above procedure with 2'-azido-2'-deoxy-6-aza-uridine yields 3',5'-di-O-acetyl-2'-azido-2'-deoxy-6-azauridine.

EXAMPLE 7

3',5'-Di-O-acetyl-2'-azido-2'-deoxy-5-bromouridine and corresponding 6-azauridine A solution of 3',5'-di-O-acetyl-2'-deoxyuridine (70 mg.) and N-bromosuccinimide (150 mg.) in chloroform (4ml.) is heated under reflux for four hours. The reaction mixture is extracted with water, and the aqueous phase is evaporated to dryness, the residue purified by preparative thin layer chromatography (Silica gel HF; 1 m. × 20 cm. × 1.3 mm.), eluting with a mixture of chloroform-acetone (85:15). The main UV band is eluted to yield 3',5'-di-O-acetyl-2'-azido-2'-deoxy-5-bromouridine.

Repeating this procedure with 3',5'-di-O-acetyl-2'-azido-2'-deoxy-6-azauridine yields 3',5'-di-O-acetyl-2'-azido-2'-deoxy-6-aza-5-bromouridine.

EXAMPLE 8

3',5'-Di-O-acetyl-2'-azido-2'-deoxy-5-chlorouridine and the corresponding 6-azauridine Repeating the procedure of Example 7 but replacing N-bromo-succinimide with N-chlorosuccinimide yields the corresponding 3',5'-di-O-acetyl-2'-azido-2'-deoxy-5-chlorouridine and 3',5'-di-O-acetyl-2'-azido-2'-deoxy-6-aza-5-chlorouridine.

EXAMPLE 9

3',5'-Di-O-acetyl-2'-azido-2'-deoxy-5-iodouridine and the corresponding 6-azauridine To a solution of 3',5'-di-O-acetyl-2'-azido-2'-deoxyuridine (35 mg.) in dimethyl sulfoxide (2 ml.) containing 5 microliters of di-N-butyldisulfide is added with stirring a solution of N-iodosuccinimide (90 mg.) in 1 ml. of dimethyl sulfoxide. The reaction is left at room temperature for 3 days and then partitioned between chloroform and water. The chloroform layer is washed with an aqueous solution of sodium thiosulfate and with water, dried over magnesium sulfate and evaporated to dryness. The chloroform extracts yield a syrup which is purified by preparative thin layer chromatography, eluting with a mixture of chloroform and acetone to yield 3',5'-di-O-acetyl-2'-azido-2'-deoxy-5-iodouridine.

Repeating the above procedure with 3',5'-di-O-acetyl-2'-azido-2'-deoxy-6-azauridine yields the corresponding 3',5'-di-O-acetyl-2'-azido-2'-deoxy-5-iodo-6-azauridine.

EXAMPLE 10

2'-Amino-2'-Deoxy-5-bromouridine and 6-Azauridine Compounds

To a solution of 3',5'-di-O-acetyl-2'-azido-2'-deoxy-5-bromouridine (30 mg.) in 3 ml. of isopropanol is added 20 mg. of sodium borohydride. The suspension is heated under reflux for three days and evaporated to dryness. The residue is mixed with water, and neutralized with glacial acetic acid to a pH of 6. The solution is then evaporated to dryness, coevaporated several times with methanol, dissolved in 1 ml. of water and absorbed on a small column of Dowex 50 H$^+$ resin. The column is rinsed with water until no UV absorbing material is eluted, and then eluted with 1 N ammonium hydroxide. The UV absorbing material is pooled and evaporated to dryness to yield a mixture of 2'-amino-2'-deoxyuridine and 2'-amino-2'-deoxy-5-bromouridine which is separated by preparative thin layer chromatography using acetone as an eluant to give pure 2'-amino-2'-deoxy-5-bromouridine.

Repeating the above procedure with the other products of Examples 7, 8 and 9 yields the corresponding 2'-amino-2'-deoxy-6-aza-5-bromouridine,
2'-amino-2'deoxy-5-chlorouridine,
2'-amino-2'-deoxy-6-aza-5-chlorouridine,
2'-amino-2'-deoxy-5-iodouridine, and
2'-amino-2'-deoxy-6-aza-5-iodouridine.

EXAMPLE 11

2'-Azido-2'-Deoxy-5-Aminouridine and 6-Azauridine

A mixture of 2'-azido-2'-deoxy-5-iodouridine (1 mmole) and dry liquid ammonia (25 ml.) is heated in a stainless steel container at 80°C for 18 hours. Afer removal of the ammonia, the pH of an aqueous solution of the product is adjusted to 2 with concentrated hydrochloric acid, and the solution is passed through a column of Dowex 50 H$^+$ ion-exchange resin. The column is washed wtih water to remove unreacted material. The 5-amino derivative is eluted with 1 N ammonium hydroxide until no UV absorbing product is eluted. The UV absorbing fraction is evaporated to dryness to yield 2'-azido-2'-deoxy-5-aminouridine.

Repeating the above procedure with 2'-azido-2'-deoxy-6-aza-5-iodouridine yields the corresponding 2'-azido-2'-deoxy-5-amino-6-azauridine.

EXAMPLE 12

2'-Azido-2'-Deoxy-5-Methylaminouridine, 2'-Azido-2'-Deoxy5-Dimethylaminouridine and the Corresponding 6-Azauridine Compounds Repeating the procedure of Example 11 but replacing dry liquid ammonia with 25 ml. of dry methylamine yields the corresponding 2'-azido-2'-deoxy-5-methylaminouridine and 2'-azido-2'-deoxy-6-aza-5-methylaminouridine.

Repeating the procedure of Example 11 but replacing the liquid ammonia with 18 ml. of dry dimethylamine yields the corresponding 2'-azido-2'-deoxy-5-dimethylaminouridine and 2'-azido-2'-deoxy-6-aza-5-dimethylaminouridine.

EXAMPLE 13

2'-Amino-2'-Deoxy-5-Aminouridine and the Corresponding 6-Azauridine

A solution of 2'-azido-2'-deoxy-5-aminouridine (5 g.) in 100 ml. of methyl is hydrogenated in the presence of a palladium-on-carbon catalyst (10 percent) under one atmosphere of hydrogen for 2 hours at room temperature. The catalyst is filtered from the mixture over celite and carefully rinsed with methanol. The filtrate is evaporated to dryness to yield 2'-amino-2'-deoxy-5-aminouridine.

Repeating the procedure with 2'-azido-2'-deoxy-5-amino-6-azauridine yields the corresponding 2'-amino-2'-deoxy-5-amino-6-azauridine.

EXAMPLE 14

2'-Amino-2'-Deoxy-5-Methylaminouridine, 2'-Amino-2'-Deoxy-5-Dimethylaminouridine and the Corresponding 6-Aza Compounds Repeating the procedure of Example 13 with the products of Example 12 yields the corresponding 2'-amino-2'-deoxy-5-methyl-aminouridine, 2'-amino-2'-deoxy-6-aza-5-methylaminouridine, 2'-amino-2'-deoxy-5-dimethylaminouridine, and 2'-amino-2'-deoxy-6-aza-5-dimethylaminouridine.

EXAMPLE 15

2'-Amino-2'-Deoxycytidine and 2'-Amino-2'-Deoxy-6-Azacytidine

To a solution of 2'-amino-2'-deoxyuridine (243 mg., 1 mmole) in 5 ml. of acetic anhydride is added 1 ml. of pyridine. The reaction mixture is left at room temperature overnight. Then methanol is added to destroy the excess ov acetic anhydride, and the solvents are evaporated under reduced pressure. The resulting syrup is partitioned between water and chloroform. The chloroform extracts are dried over magnesium sulfate, filtered and evaporated to dryness. The residue is crystallized from acetonehexane to yield 2'-acetamido-3',5'-di-O-acetyl-2'-deoxyuridine.

A solution of this compound (369 mg., 1 mmole) and phosphorus pentasulfide (444 mg., 2 mmole) in 30 ml. of dry pyridine is heated at reflux temperature for 2.5 hours. The reaction mixture is cooled and evaporated to dryness. The resulting syrup is dissolved in chloroform. The chloroform solution is extracted with water, 0.2 N sulfuric acid and finally water. The chloroform layer is dried over magnesium sulfate, filtered and evaporated to dryness. The residue is purified by preparative thin layer chromatography, and the main UV band is eluted with methanol to yield 1-(2'-thioacetamido-3',5'-di-O-acetyl-2'-deoxy-β-D-ribofuranosyl)-4-thiouracil.

A solution of this compound in 50 ml. of absolute methanol saturated with ammonia is heated for 18 hours at 95°C in a steel container. After cooling the reaction mixture, the solvent is evaporated to dryness under reduced pressure. The residue is dissolved in water and treated with ion-exchange resin (Dowex AG-1 OH⁻ form). The resin is filtered and washed with water. The filtrate is evaporated to dryness, and the residue is crystallized from methanol to yield 2'-amino-2'-deoxycytidine.

Repeating the above procedure but replacing 2'-amino-2'-deoxyuridine with 2'-amino-2'-deoxy-6-azauridine yields the corresponding 2'-amino-2'-deoxy-6-azacytidine.

EXAMPLE 16

Other 2'-Amino-2'-Deoxycytidines and 6-Azacytidines

Repeating the procedure of Example 15 but replacing 2'-amino-2'-deoxyuridine with
2'-amino-2'-deoxy-5-methyluridine,
2'-amino-2'-deoxy-6-aza-5-methyluridine,
2'-amino-2'-deoxy-5-trifluoromethyluridine,
2'-amino-2'-deoxy-6-aza-5-trifluoromethyluridine,
2'-amino-2'-deoxy-5-aminouridine,
2'-amino-2'-deoxy-5-amino-6-azauridine,
2'-amino-2'-deoxy-5-methylaminouridine,
2'-amino-2'-deoxy-6-aza-5-methylaminouridine,
2'-amino-2'-deoxy-5-dimethylaminouridine, and
2'-amino-2'-deoxy-5-dimethylamino-6-azauridine yields the corresponding
2'-amino-2'-deoxy-5-methylcytidine,
2'-amino-2'-deoxy-6-aza-5-methylcytidine,
2'-amino-2'-deoxy-5-trifluoromethylcytidine,
2'-amino-2'-deoxy-6-aza-5-trifluoromethylcytidine,
2'-amino-2'-deoxy-5-aminocytidine,
2'-amino-2'-deoxy-5-amino-6-azacytidine,
2'-amino-2'-deoxy-5-methylaminocytidine,
2'-amino-2'-deoxy-6-aza-5-methylaminocytidine,
2'-amino-2'-deoxy-5-dimethylaminocytidine, and
2'-amino-2'-deoxy-6-aza-5-dimethylaminocytidine.

EXAMPLE 17

2'-DEOXY-2'-GLYCYLAMIDOURIDINE

A solution of 2'-amino-2'-dexoyuridine (243 mg., 1 mmole) and the N-hydroxysuccinimide ester of N-(monomethoxytrityl)glycine (444 mg., 1 mmole) described in Biochem. Biophys. Acta. 138, 241 (1967) in 5 ml. of dimethyl formamide containing 0.15 ml. (1 mmole) of triethylamine is left at room temperature for 24 hours. Then 2 ml. of 2 N hydrochloric acid is slowly added with magnetic stirring of the mixture, and the reaction mixture is left at room temperature for 30 minutes. The excess acid is neutralized by adding solid sodium bicarbonate. The solvents are then evaporated to dryness under vacuum, and the residue is mixed with methanol, and purified by preparative thin layer chromatography, the main UV band yielding 2'-deoxy-2'-glycyl-amidouridine.

EXAMPLE 18

2'-Deoxy-2'-L-alanylamidouridine

A mixture of 486 mg. of 2'-amino-2'-deoxyuridine, 774 mg. of the N-hydroxysuccinimide ester of N-t-butoxycarbonyl-L-alanine (prepared by the method of Anderson et al. J.A.C.S. 86, 1839 (1964)) and 168 mg. of sodium bicarbonate is stirred in 25 ml. of aqueous ethanol for 18 hours. The solvent is evaporated, and the residue partitioned between ethyl acetate and water. The organic phase is evaporated, and the t-butoxy carbonyl group is removed by treatment with trifluoroacetic acid at room temperture for 1 hour. The resulting 2'-deoxy-2'-L-alanylamidouridine is purified by preparative thin layer chromatography.

EXAMPLE 19

Other 1-(2-L-Alanylamido-2-Deoxy-β-D-Ribofuranosyl)Pyrimidines and 6-Azapyrimidines Repeating the procedure of Example 18 with the products of Examples 5, 10, 13, 14, 15 and 16 yields the corresponding 1-(2-L-alanylamido-2-deoxy-β-D-ribofuranosyl)pyrimidines wherein the pyrimidine grou is, respectively, 5-fluorouracil, 6-azauracil, thymine, 6-azathymine, 6-aza-5-fluorouracil, 5-trifluoromethyluracil, 6-aza-5-trifluoromethyluracil, 5-bromouracil, 6-aza-5-bromouracil, 5-chlorouracil, 6-aza-5-chlorouracil, 5-iodouracil, 6-aza-5-iodouracil, 5-aminouracil, 5-amino-6-azauracil, 5-methylaminouracil, 6-aza-5-methylaminouracil, 5-dimethylaminouracil, 6-aza-5-dimethylaminouracil, cytosine, 6-azacytosine, 5-methylcytosine, 6-aza-5-methylcytosine, 5-trifluoromethylcytosine, 6-aza-5-trifluoromethylcytosine, 5-aminocytosine, 5-amino-6-azacytosine, 5-methylaminocytosine, 6-aza-5- methylaminocytosine, 5-dimethylaminocytosine, and 6-aza-5-dimethylaminocytosine.

EXAMPLE 20

Other 2'-N-(Aminoacylamido)-2'-Deoxyuridines

Repeating the procedure of Example 18 with N-hydroxysuccinimide esters of other N-(t-butoxycarbonyl)amino acids such as glycine, D-alanine, L-valine, L-leucine, L-isoleucine, L-phenylalanine, D-phenylalanine, L-tyrosine, L-proline, L-hydroxyproline, L-serine, L-threonine, L-cysteine, L-methionine, L-tryptophane, L-lysine, and L-histidine (prepared by the method of Anderson et al. J.A.C.S. 86, 1839 (1964)) yields the corresponding 2'-deoxy-2'-glycylamidouridine,
2'-D-alanylamido-2'-deoxyuridine,
2'-deoxy-2'-L-valylamidouridine,
2'-deoxy-2'-L-leucylamidouridine,
2'-deoxy-2'-L-isoleucylamidouridine,
2'-deoxy-2'-L-phenylalanylamidouridine,
2'-deoxy-2'-D-phenylalanylamidouridine,
2'-deoxy-2'-L-tryosylamidouridine,
2'-deoxy-2'-L-prolylamidouridine,
2'-deoxy-2'-L-hydroxyprolylamidouridine,
2'-deoxy-2'-L-serylamidouridine,
2'-deoxy-2'-L-threonylamidouridine,
2'-L-cysteinylamido-2'-deoxyuridine,
2'-deoxy-2'-L-methionylamidouridine,
2'-deoxy-2'-L-tryptophylamidouridine,
2'-deoxy-2-L-lysylamidouridine, and
2'-deoxy-2'-L-histidylamidouridine.

Repeating the above procedure with N-hydroxysuccinimide esters of N-benzoxycarbonylamino acids such as L-glutamic-γ-benzyl ester, L-asparatic-β-benzyl ester, and nitro-L-arginine, and hydrogenating the product with palladium-on-carbon in methanol at room temperature for six hours at one temperature of hydrogen, filtering the reaction mixture, evaporating the filtrate to dryness, and purifying the product by ion exchange chromatography yields 2'-deoxy-2'-L-glutamylamidouridine, 2'-L-aspartylamido-2'-deoxyuridine, and 2'-L-arginylamido-2'-deoxyuridine, respectively.

The N-hydroxysuccinimide ester of γ-benzyl-N-carbobenzoxy-L-glutamic acid is prepared as follows. N,N-dicyclohexylcarbodiimide (0.1 mM.) is added to a solution of γ-benzyl-N-carbobenzoxy-L-glutamic acid (0.1 mM) and hydroxysuccinimide (0.1 mM) in 250 ml. of dioxane with cooling. The reaction mixture is left at 0°C for 24 hours. The dicyclohexylurea formed is filtered from the mixture and washed with dioxane. The filtrate is evaporated to dryness in vacuo to yield a solid which is purified by chromatography to yield the N-hydroxysuccinimide ester of γ-benzyl-N-carbobenzoxy-L-glutamic acid. Repeating this procedure with β-benzyl-N-carbobenzoxy-L-aspartic acid and N-carbobenzoxynitro-L-arginine yields the corresponding N-hydroxysuccinimide esters.

EXAMPLE 21

1-(2-[Aminoacylamido]-2'-Deoxy-β-D-Ribofuranosyl)-Pyrimidines and 6-Azapyrimidines Repeating the procedures of Example 20 but replacing 2'-amino-2'-deoxyuridine with the products of Examples 5, 10, 13, 14, 15 and 16 yields the corresponding 1-(2-[aminoacylamido]-2'-deoxy-β-D-ribofuranosyl)pyrimidines and 1-(2-[aminoacylamido]-2'-deoxy-β-D-ribofuranosyl)-6-azapyrimidines wherein the amino acid acyl groups are glycyl, L-alanyl, D-alanyl, L-valyl, L-leucyl, L-isoleucyl, L-phenylalanyl, D-phenylalanyl, L-tyrosyl, L-prolyl, L-hydroxyprolyl, L-seryl, L-threonyl, L-cysteinyl, L-methionyl, L-tryptophyl, L-aspartyl, L-glutamyl acid, L-arginyl, L-lysyl and L-histidyl groups, and the pyrimidines include 5-fluorouracil, 6-azauracil, thymine, 6-azathymine, 6-aza-5-fluoro-uracil, 5-trifluoromethyluracil, 6-aza-5-trifluoromethyluracil, 5-bromouracil, 6-aza-5-bromouracil, 5-chlorouracil, 6-aza-5-chlorouracil, 5-iodouracil, 6-aza-5-iodouracil, 5-aminouracil, 6-aza-5-aminouracil, 5-methylaminouracil, 6-aza-5-methylaminouracil, 5-dimethylaminouracil, 6-aza-5-dimethylaminouracil, 6-azacytosine, 5-methylcytosine, 6-aza-5-methylcytosine, 5-trifluoromethylcytosine, 6-aza-5-trifluoromethylcytosine, 5-aminocytosine, 6-aza-5-aminocytosine, 5-methylaminocytosine, 6-aza-5-methylaminocytosine, 5-dimethylaminocytosine and 6-aza-5-dimethylaminocytosine groups.

EXAMPLE 22

1-(2'-Deoxy-2'-Dipeptidylamidouridines

Repeating the procedure of Example 18 but replacing the N-hydroxysuccinimide ester of N-t-butoxycarbonyl-L-alanine with N-hydroxysuccinimide esters of N-t-butoxycarbonyl-dipeptides wherein the dipeptides are formed from two of the same or different amino acids such as glycine, L-alanine, D-alanine, L-valine, L-leucine, L-isoleucine, L-phenylalanine, D-phenylalanine, L-L-tyrosine, L-proline, L-hydroxyproline, L-serine, L-threonine, L-cysteine, L-methionine, L-tryptophane, L-lysine, and L-histidine or N-hydroxysuccinimide esters of N-benzoxycarbonylamino acids such as L-glutamic-γ-benzyl ester, L-aspartic-β-benzyl ester, and nitro-L-arginine (followed by hydrogenation with palladium-on-carbon in methanol as described in Example 20 for dipeptides containing the latter three groups) yields the corresponding 2'-deoxy-2'-dipeptidylamidouridines.

EXAMPLE 23

Other 1-(2'-Deoxy-2'-DipeptidylamidoβD-Ribofuranosyl)-Pyrimidines

Repeating the procedure of Example 22 with the products of Examples 5, 10, 13, 14, 15 and 16 yields the corresponding 1-(2'-deoxy-2'-dipeptidylamido-β-D-ribofuranosyl)-pyrimidines wherein the pyrimidines include 5-fluorouracil, 6-azauracil, thymine, 6-azathymine, 6-aza-5-fluorouracil, 5-trifluoromethyluracil, 6-aza-5-trifluoromethyluracil, 5-bromouracil, 6-aza-5-bromouracil, 5-chlorouracil, 6-aza-5-chlorouracil, 5-iodouracil, 6-aza-5-iodouracil, 5-aminouracil, 6-aza-5-aminouracil, 5-methylaminouracil, 6-aza-5-methylaminouracil, 5-dimethylaminouracil, 6-aza-5-dimethylaminouracil, cytosine, 6-azacytosine, 5-methylcytosine, 6-aza-5-methylcytosine, 5-trifluoromethylcytosine, 6-aza-5-trifluoromethylcytosine, 5-aminocytosine, 6-aza-5-aminocytosine, 5-methylaminocytosine, 6-aza-5-methylaminocytosine, 5-dimethylaminocytosine and 6-aza-5-dimethylaminocytosine.

We claim:

1. A 1-(β-D-ribofuranosyl)pyrimidine compound selected from the group of compounds represented by the formula:

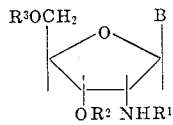

wherein
B is a pyrimidine base or a hydrolyzable acyl derivative thereof derived from a carboxylic acid having from one to 12 carbon atoms;
$R^1$ is hydrogen, an acyl group of an amino acid, an acyl group of a dipeptide, or a hydrolyzable acyl derivative of an acyl group of an amino acid or an acyl group of a dipeptide, said acyl groups being derived from a carboxylic acid having from one to 12 carbon atoms and
$R^2$ and $R^3$ each is hydrogen or a conventional hydrolyzable acyl group derived from a carboxylic acid having from one to 12 carbon atoms.

2. A compound of claim 1 wherein $R^1$, $R^2$ and $R^3$ each is hydrogen.

3. A compound of claim 2 wherein B is uracil-1-yl, cytosin-1-yl, 5-bromouracil-1-yl, 5-chlorouracil-1-yl, 5-iodouracil-1-yl, 5-fluorouracil-1-yl, thymin-1-yl, 5-methylcytosin-1-yl, 5-trifluoromethyluracil-1-yl, 5-trifluoromethylcytosin-1-yl, 5-aminouracil-1-yl, 5-aminocytosin-1-yl, 5-methylaminouracil-1-yl, 5-methylaminocytosin-1-yl, 5-dimethylaminouracil-1-yl, 5-dimethylaminocytosin-1-yl, 5-hydroxyuracil-1-yl, or a 6 aza counterpart radical thereof.

4. As a compound of claim 3, 2'-amino-2'-deoxyuridine.

5. As a compound of claim 3, 2'-amino-2'-deoxy-5-bromouridine.

6. As a compound of claim 3, 2'-amino-2'-deoxy-5-chlorouridine.

7. As a compound of claim 3, 2'-amino-2'-deoxy-5-iodouridine.

8. As a compound of claim 3, 2'-amino-2'-deoxy-5-fluorouridine.

9. As a compound of claim 3, 2'-amino-2'-deoxy-5-aminouridine.

10. As a compound of claim 3, 2'-amino-2'-deoxy-5-methylaminouridine.

11. As a compound of claim 3, 2'-amino-2'-deoxy-5-dimethylaminouridine.

12. As a compound of claim 3, 2'-amino-2'-deoxycytidine.

13. A compound of claim 1 wherein $R^1$ is an acyl group of an amino acid or a dipeptide, and $R^2$ and $R^3$ each is hydrogen.

14. A compound of claim 13 wherein $R^1$ is an acyl group of an amino acid.

15. As a compound of claim 14, 2'-deoxy-2'-glycylamidouridine.

16. As a compound of claim 14, 2'-deoxy-2'-L-alanylamidouridine.

17. As a compound of claim 14, 2'-deoxy-2'-L-lysylamidouridine.

18. As a compound of claim 14, 2'-deoxy-2'-L-arginylamidouridine.

* * * * *

UNITED STATES PATENT OFFICE
CERTIFICATE OF CORRECTION

Patent No. 3,755,295     Dated August 28, 1973

Inventor(s) Julien P. Verheyden; John G. Moffatt

It is certified that error appears in the above-identified patent and that said Letters Patent are hereby corrected as shown below:

Column 8, line 12, "2'deoxy" should read --2'-deoxy--.

Column 10, line 55, "grou" should read --group--.

Column 11, line 39, "temperature" should read --atmosphere--.

Column 12, line 16, after "6-aza-5-dimethylaminouracil," insert --cytosine,--; line 47, "DipeptidylamidoβD " should read --Dipeptidylamido-β-D--.

Column 13, line 16, "acyl" (second occurrence) should be deleted; and line 21, "conventional" should be deleted.

Signed and sealed this 22nd day of January 1974.

(SEAL)
Attest:

EDWARD M. FLETCHER, JR.
Attesting Officer

RENE D. TEGTMEYER
Acting Commissioner of Patents